(12) United States Patent
Manfredotti et al.

(10) Patent No.: US 7,461,729 B2
(45) Date of Patent: Dec. 9, 2008

(54) DEVICE FOR SUPPORTING AN AIRCRAFT BATTERY

(75) Inventors: Thomas Manfredotti, La Colle sur Loup (FR); Damien Sequera, Nimes (FR)

(73) Assignee: Eurocopter, Marignane (FR)

( * ) Notice: Subject to any disclaimer, the term of this patent is extended or adjusted under 35 U.S.C. 154(b) by 279 days.

(21) Appl. No.: 11/418,179

(22) Filed: May 5, 2006

(65) Prior Publication Data

US 2007/0114104 A1    May 24, 2007

(30) Foreign Application Priority Data

May 6, 2005   (FR)   .................................. 05 04606

(51) Int. Cl.
  *F16F 7/104*   (2006.01)
(52) U.S. Cl. .................. 188/379; 267/140.5; 244/17.11
(58) Field of Classification Search ................ 188/379, 188/380; 267/136, 140.5, 140.11, 36.1, 40, 267/47; 248/544, 565, 605, 618, 621, 629; 244/17.11
See application file for complete search history.

(56) References Cited

U.S. PATENT DOCUMENTS

| | | | |
|---|---|---|---|
| 4,230,291 A | | 10/1980 | Marshall II, et al. |
| 5,620,068 A | | 4/1997 | Garnjost et al. |
| 5,947,453 A | * | 9/1999 | Eastman et al. ............. 267/136 |
| 6,009,986 A | * | 1/2000 | Bansemir et al. ............ 188/380 |
| 6,286,782 B1 | * | 9/2001 | Bansemir et al. ......... 244/17.11 |

FOREIGN PATENT DOCUMENTS

| | | |
|---|---|---|
| FR | 2775042 | 8/1999 |
| JP | 03-163239 A | 7/1991 |
| JP | 2-557536 | 9/1996 |

* cited by examiner

*Primary Examiner*—Michael R Mansen
*Assistant Examiner*—Michael Kreiner
(74) *Attorney, Agent, or Firm*—Young & Thompson (57) ABSTRACT

A device is provided for suspending a battery (20) of an aircraft, the device including at least one spring (41, 54); the device further includes an adjustment element enabling the stiffness of the spring to be adjusted.

13 Claims, 6 Drawing Sheets

DEVICE FOR SUPPORTING AN AIRCRAFT BATTERY

The present invention relates to a device for supporting a battery of a rotorcraft or of some other kind of aircraft.

The technical field of the invention is that of manufacturing helicopters.

BACKGROUND OF THE INVENTION

It is known to attenuate the vibration of a rotorcraft by means of active or passive attenuator devices; passive devices are resonators tuned to a determined frequency, while active devices rely on an actuator that is controlled so as to deliver forces that oppose measured vibration.

French patent No. 2 775 042 and U.S. Pat. No. 6 286 782 describe a passive attenuator system using a helicopter battery as its vibrating weight, the system being tuned to a frequency close to 5 hertz (Hz); in the device described in those patents, the battery is secured to four plane springs forming a tube in which the battery is received; the battery can thus oscillate in a vertical direction and in a lateral direction, at a resonant frequency that depends on the geometry of the plane springs and on the stiffness of the material from which they are made.

Although it presents certain advantages, that system does not enable the resonant frequency to be adjusted to a desired value; unfortunately, the vibration to which the various zones of a rotorcraft are subjected can present components of varying frequency; such variations may be due to varying flight conditions; furthermore, two rotorcraft of the same model may present two different vibration spectra, e.g. because they are fitted out differently.

OBJECTS AND SUMMARY OF THE INVENTION

It is therefore important to be capable of providing a vibration attenuator system that can be tuned to any frequency lying within a predetermined range of frequencies.

The invention satisfies that need.

The invention provides a device for suspending a battery (for storing electrical energy) on board an aircraft, in particular a rotorcraft, the device comprising at least one spring together with adjustment means designed and arranged to enable the stiffness of the spring to be varied so that the resonant frequency of the battery mounted on the suspension device can be adjusted to an optimum frequency value within a certain frequency range, in order to counter vibration of the rotorcraft at said frequency.

In a preferred embodiment, the suspension device comprises two springs together with two adjustment means enabling the respective stiffnesses of each of the two springs to be adjusted.

Also preferably, when loaded by the battery, the springs and their associated adjustment means can be used to adjust the two resonant frequencies of the suspension that correspond respectively to two resonant modes of deformation of the suspension under load, firstly in vertical translation, and secondly in lateral translation; also preferably, the lateral translation takes place along the long axis of the battery, for a battery having the general shape of a rectangular parallelepiped.

Spring stiffness(es) is/are preferably selected so that said resonant frequency(ies) of the suspension receiving the battery is/are greater than 10 Hz, and in particular lie in a frequency range of about 11 Hz to 50 Hz, and more preferably lie in the range about 20 Hz to about 30 Hz.

In a preferred embodiment of the invention, the device is provided and arranged so as to rest on one or more supports secured to the body of the aircraft (or rotorcraft), and is also provided and arranged so that the battery rests on the device, which device is thus interposed between the support and the battery, the height of the device being less than the height of the battery so as to limit overall size.

According to a preferred characteristic, the or each spring comprises one or several elastically-deformable blade(s), and the stiffness adjustment means are provided and arranged to modify the length of the active (or working) portion of the spring under consideration; in particular, the stiffness adjustment means may comprise a member (such as an abutment) that can be moved at least between a first position giving the spring blade a first stiffness and a second position giving the spring blade a second stiffness different from the first.

In a more preferred embodiment of the invention, the member is movable continuously along a support such as a bar between two extreme positions of the member, thus making it possible to vary the stiffness of the spring substantially continuously over a determined range of stiffness values; the corresponding resonant frequency of the assembly can thus be accurately set to a predetermined value.

Preferably, the or each blade extends substantially parallel to the long axis of the device (and of the battery).

In a particular embodiment, the device comprises:

a) a first bent bar provided and arranged to be mounted to pivot relative to the structure of the aircraft via at least two resilient hinges about a first pivot axis that is substantially parallel to the long axis of the device;

b) a first spring blade secured at two spaced-apart zones (in particular two end zones) of the first bar, and extending substantially parallel to the first bar;

c) a second bent bar provided and arranged to be mounted to pivot relative to the structure of the aircraft via at least two resilient hinges about a second pivot axis parallel to the pivot axis of the first bar;

d) at least one (and preferably two) riders mounted to slide along the second bar, the riders being designed and arranged to pinch the first spring blade against the second bar, thereby reducing its active length, and consequently increasing its stiffness;

e) a battery support hinged on each of the two bent bars, preferably via two pairs of resilient hinges;

f) at least one bar pivotally hinged under the battery support and extending substantially parallel to said long axis;

g) at least one second spring blade designed and arranged to be secured to the structure of the aircraft via a pivot and to extend along the pivot bar; and h) a fastener member (preferably acting by friction or by clamping) suitable for sliding along the hinged bar and/or along the second spring blade, and for securing said bar to said spring blade, while modifying the length of the active portion of the spring blade.

Also preferably, the device comprises two assemblies as defined above under f), g), and h), the assemblies being disposed symmetrically on either side of the bent bars.

Also preferably, at least one spring blade, in particular said first spring blade, deforms in twisting under the effect of the weight of the battery, while at least one spring blade, in particular said second spring blade, deforms in bending under the effect of the weight of the battery.

BRIEF DESCRIPTION OF THE DRAWINGS

Other characteristics and advantages of the invention appear from the following description given with reference to the accompanying drawings that show preferred embodiments of the invention without any limiting character.

MORE DETAILED DESCRIPTION

Figure 1:
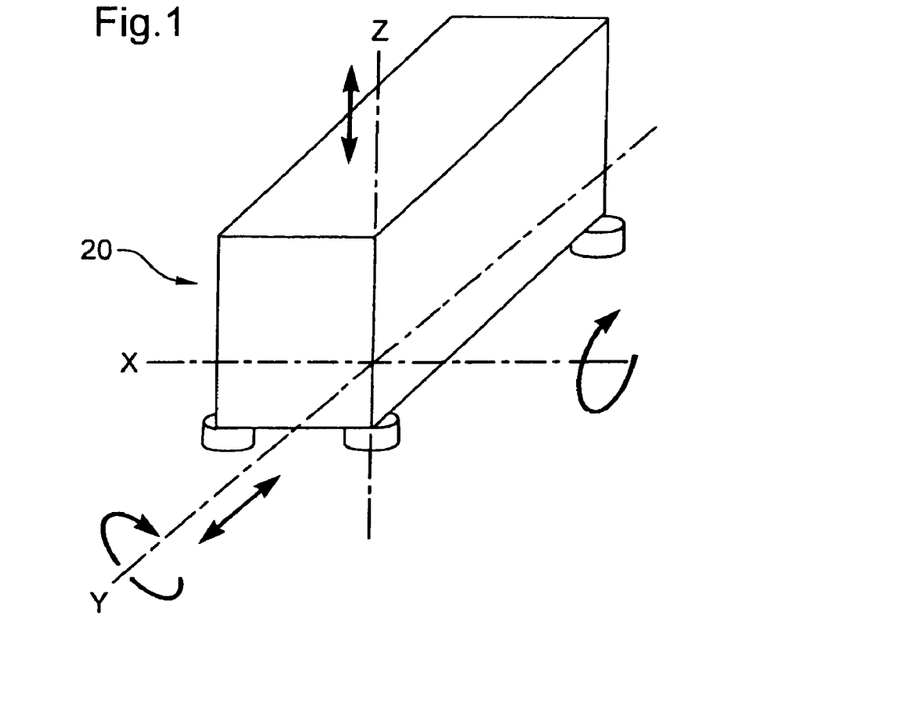
FIG. 1 is a diagrammatic perspective view of a battery in the form of a rectangular parallelepiped.

With reference to FIG. 1, the battery 20 is in the form of a rectangular parallelepiped and is oriented along two transverse axes X and Y of the aircraft, and along a vertical axis Z.

When a body that is assumed to be non-deformable—an assumption that is valid for a battery—is suspended relative to a support—specifically an aircraft—via a "suspension" (i.e. a suspension device), the suspended body can move relative to the support in "preferred", or "resonant", or "natural" modes of displacement; these modes include modes of displacement in translation along each of the axes X, Y, and Z, and modes of pivoting displacement about said axes (pitch, roll, and yaw) taking place at respective (resonant) frequencies that depend in particular on the configuration and the stiffnesses of the elements forming the suspension: these frequencies are usually low; coupling phenomena can appear between two preferred modes, in particular when the frequencies corresponding to both modes are close to each other.

It will thus be understood that it is essential to have complete control over these phenomena in order to be able to make effective use of a suspended battery as a passive attenuator of vibration on board an aircraft; in particular, it is necessary to avoid the resonator constituted by the suspended battery "locking" on (being turned to) two frequencies that are very close together, since that can lead to a resonant mode relative to one axis behaving as an attenuator for a mode relative to another axis, because of the coupling between the modes.

In particular, the invention seeks to avoid coupling between a mode in translation along the Z axis and a mode in translation along the Y axis.

Figure 2:
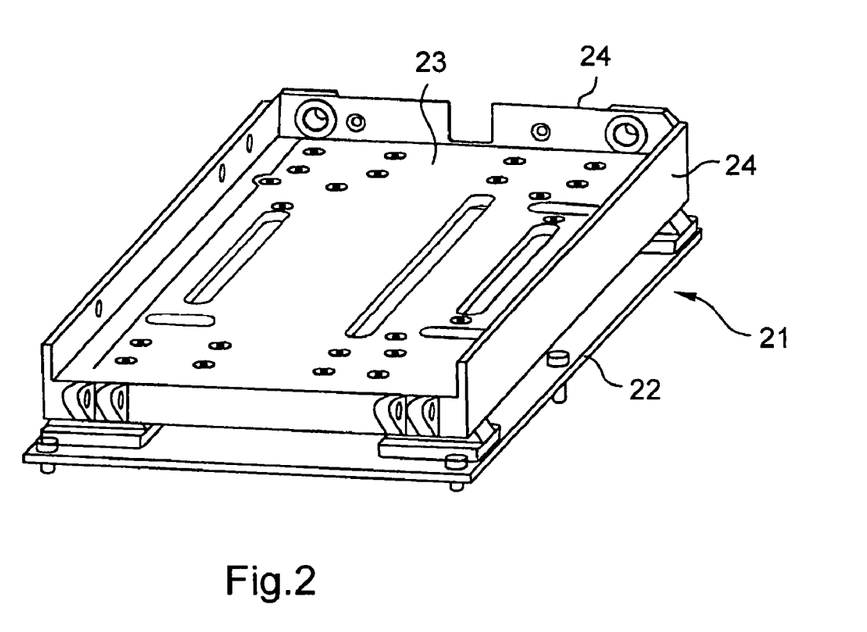
FIG. 2 is a diagrammatic perspective view of a device of the invention interposed between a plate secured to the structure of the aircraft, and a shelf or tray designed to receive a battery.

With reference to FIG. 2, the device 21 of the invention is interposed between a support 22 forming part of the structure of the aircraft, and a shelf 23 on which the battery rests, the shelf being in the form of a tray shaped to match the base of the battery (not shown) by means of upstanding rims 24.

Figure 3:
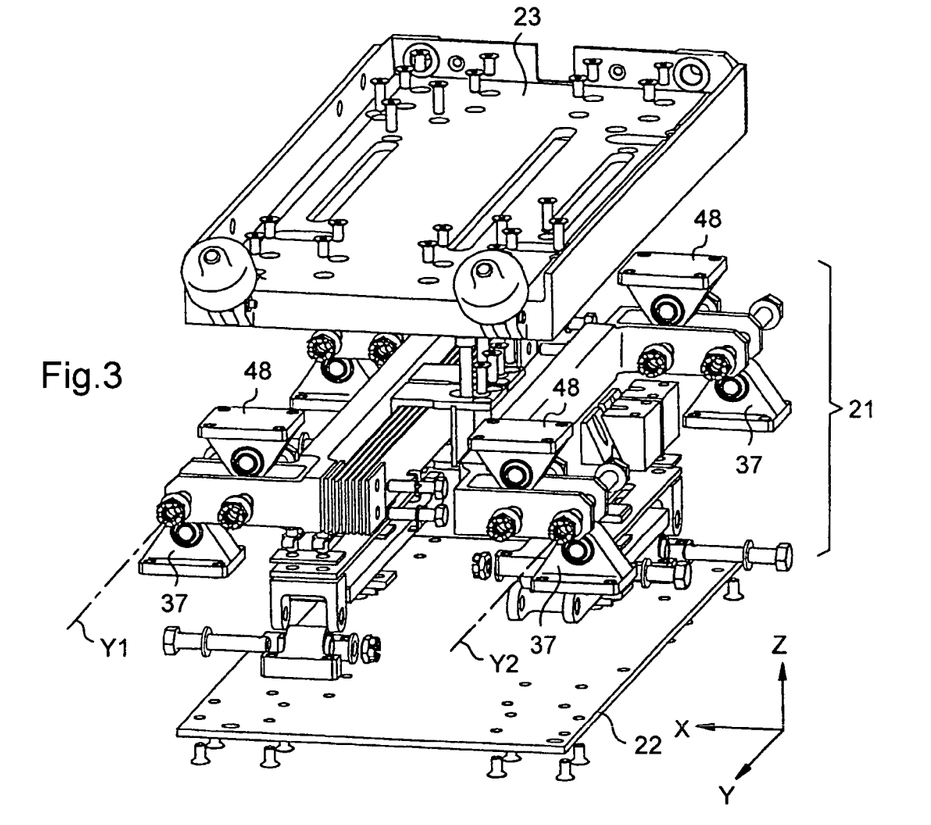
FIG. 3 is an exploded perspective view of the FIG. 2 device.
Figure 4:
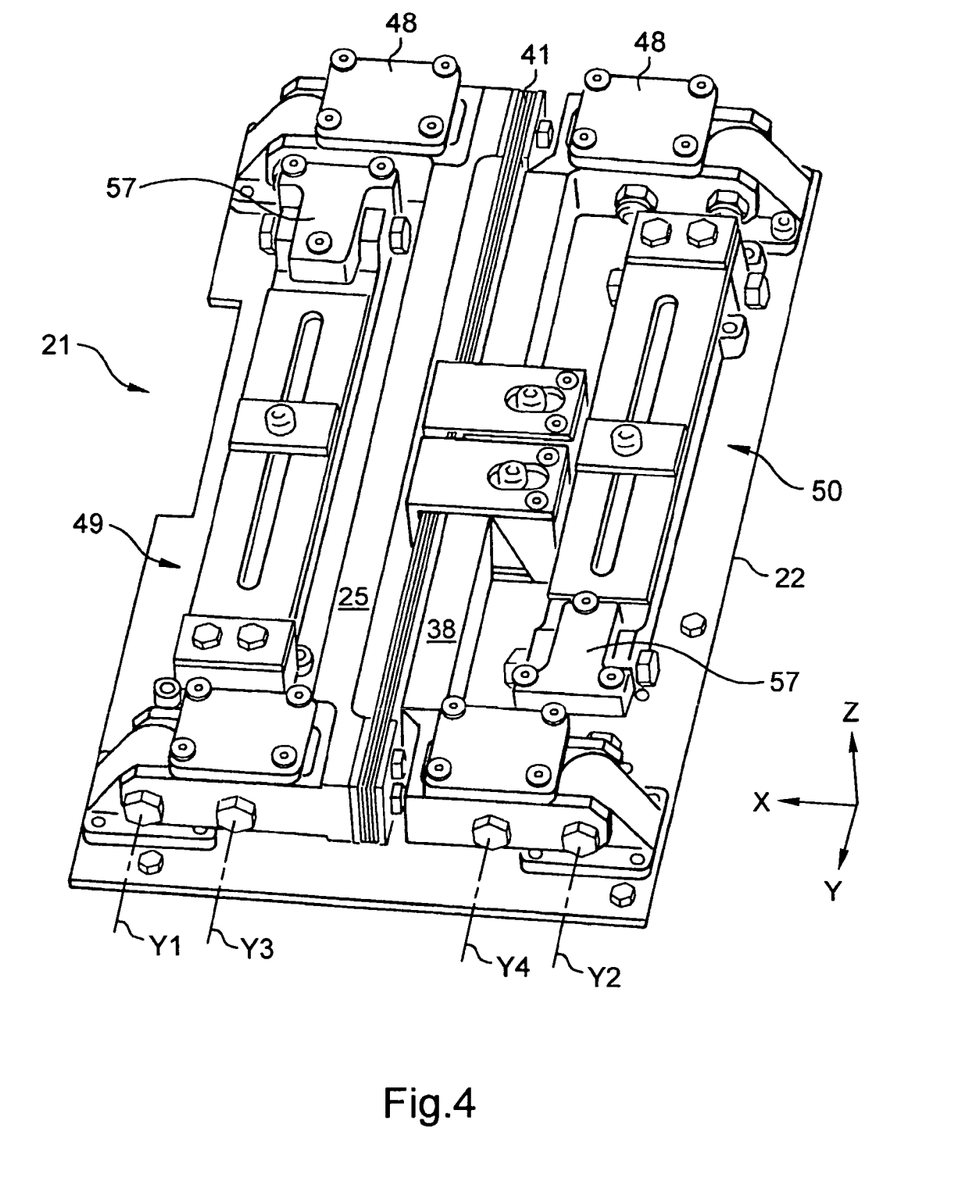
FIG. 4 is a diagrammatic perspective view of the suspension device of FIGS. 2 and 3, for supporting the battery-receiving tray.
Figure 5:
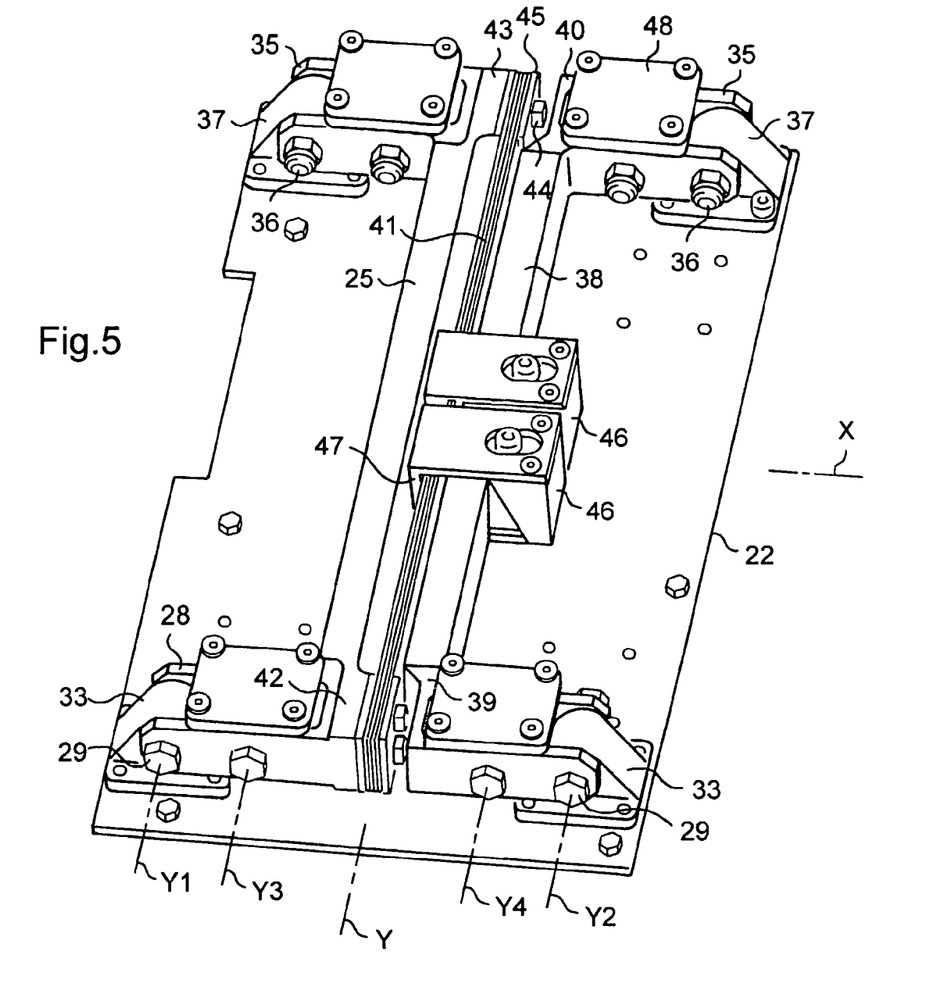
FIG. 5 is a view similar to FIG. 4, but omitting the elements of the suspension device that serve to adjust the resonant frequency corresponding to the transverse mode of battery displacement; these elements being shown in FIGS. 10 and 11.

With reference to FIGS. 3 to 5 in particular, the device 21 comprises:

a) a first bent bar 25 provided and arranged to be mounted to pivot relative to the structure of the rotorcraft via at least two resilient hinges 31 about a first pivot axis (Y1) substantially parallel to the long axis (Y) of the device;

b) a first spring blade 41 secured via two end zones to the first bar and extending substantially parallel to the first bar;

c) a second bent bar 38 provided and arranged to be pivotally mounted relative to the structure of the rotorcraft via at least two resilient hinges, to pivot about a second pivot axis (Y2) parallel to the first bar pivot axis;

d) at least one (and preferably two) riders (46, 47) mounted to slide along the second bar, designed and arranged to pinch the first spring blade against the second bar and thus reduce its active length and consequently increase its stiffness;

e) a battery support 23 hinged to each of the two bent bars, preferably via two pairs of resilient hinges;

f) at least one bar 59 pivotally hinged under the battery support and extending substantially parallel to said long axis (Y);

g) at least one second spring blade 54 designed and arranged to be secured to the rotorcraft structure via a pivot and to extend along the pivot bar 59; and h) a fastener member 61, 62 (preferably acting by friction or by clamping) suitable for sliding along the hinged bar and/or along the second hinged spring blade and to secure said bar to said spring, thereby limiting the active portion of the spring.

The operation of the suspension relative to the vertical axis Z and its mode of deformation corresponding to the suspended battery moving vertically in translation are as described below with reference more particularly to FIGS. 5 to 9.

The first bent bar or cradle 25 is mounted to pivot about the axis Y1 relative to the support 22 via a hinge fitted to each of its two bent ends 26, 27: for this purpose, the end 26 presents a fork 28 holding a pin 29 that extends along the axis Y1, thus enabling the fork to pivot about said axis.

Figure 6:
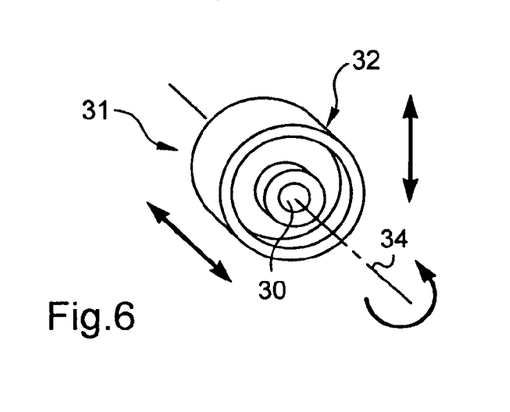
FIG. 6 is a diagrammatic perspective view of a preferred embodiment of a resilient hinge used in the structure of a device of the invention.

The screw 29 extends through the central bore 30 of a "silentblock" hinge 31 as shown in FIG. 6; this hinge has an outer cylindrical shape 32 that is received in a lug 33 rigidly secured to the support 22; the hinge presents high radial stiffness, while its axial and twisting stiffnesses (relative to its axis of symmetry 34) are low.

Similarly, the second bent end 27 of the bar 25 has a fork 35 pivoting about a screw 36 extending along the axis Y1 in the bore of a second resilient hinge or abutment 31 identical to the first, said hinge or abutment being received in a lug 37 secured to the support 22.

An identical structure hinges the second bent bar 38 via its two ends 39 and 40 about the axis Y2 relative to the support 22.

Substantially plane spring blades 41 extend between the central portions of the bars 25 and 38, along the bars, in a vertical midplane containing the Y axis or parallel thereto.

The axes Y, Y1, Y2, Y3, and Y4 are parallel to one another.

This stack of blades is secured to the two longitudinal ends 42 and 43 of the central portion of the bar 25 by screws 44 that clamp against the stack via respective washers 45.

Two identical riders 46 are mounted to slide along the Y axis over the central portion of the second bar 38.

Each of these riders is placed astride a central or intermediate portion of the stack of blades 41, bearing against one of the faces of said stack placed facing the first bar 25 via a jaw 47; the distance (as measured along the transverse X axis) between the jaw 47 and each rider on the bar 38 can be adjusted so that the jaw pinches the zone of the blades 41 having the rider astride it against the bar 38 so as to form a friction connection between said zone of the blades and the bar 38.

By moving the rider along the bar 38 and by pinching the blades using the jaw of the rider, it is possible to modify the "active" length of the blades 41, i.e. the length of the portion of said blades that extends between the jaw of the rider and the corresponding end 42 or 43 of the bar 25; this serves to adjust the stiffness in the Z direction of the stack of spring blades.

The battery support tray 23 is secured to each of the four ends of the two bars 25 and 38 via four respective parts 48 similar or identical to the lugs 37, and via four resilient abutments (like 31 in FIG. 6) and four screws 49, as shown in FIG. 5.

This mounting similar to the mounting of the bars 25, 38 on the support 22 enables the two parts 48 situated to the left in FIG. 5 to pivot about the axis Y3 relative to the bar 25, and the two parts 48 situated to the right in FIG. 5 to pivot about the axis Y4 relative to the bar 38.

Figure 7:
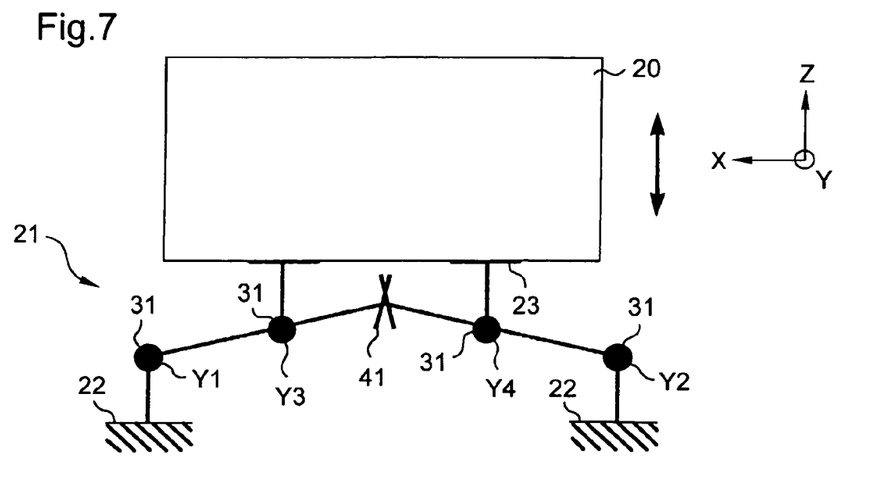
FIG. 7 is a diagram showing the twisting forces acting on the spring blade in the FIG. 5 device during movement in vertical translation of the battery that rests on the device.
Figure 8:
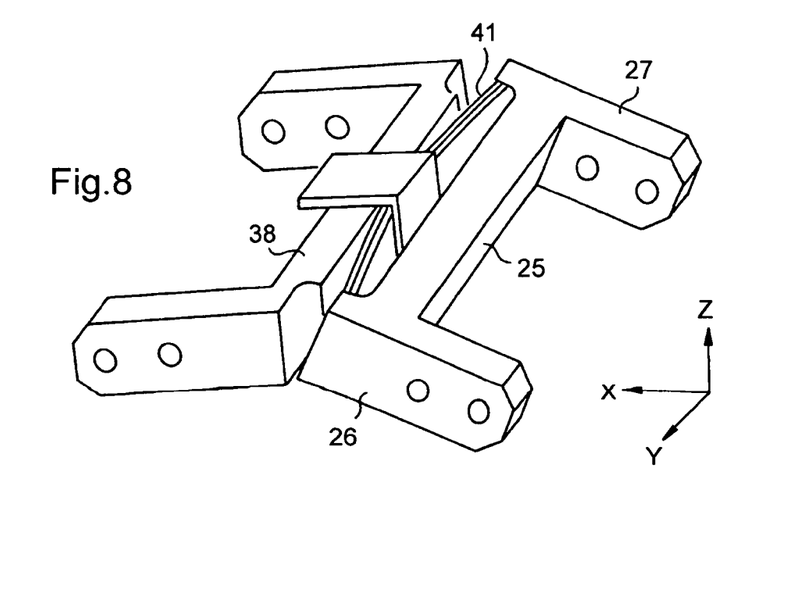
FIG. 8 is a diagram showing the bending forces acting on the spring blade of the FIG. 5 device during pivoting movements about the long axis Y of the battery.

By means of this suspension 21, when the battery 20 and its tray 23 moves in vertical translation, the two cradles 25, 38 pivot (about the axes Y1 and Y2) symmetrically about the vertical midplane (YZ); the blades 41 are subjected to twisting, and their ability to deform confers a small amount of stiffness to the suspension for this mode of deformation as shown diagrammatically in FIGS. 7 and 8.

On tilting about the Y axes, the cradles 25 and 38 pivot in opposite directions, one moving downwards and the other upwards; this subjects the blades 41 to bending that is opposed by their greatest second moment of area; since their stiffness in this direction is high, the stiffness in twisting about Y is consequently large, thereby giving this resonant mode a frequency that is high and limiting the movements of the battery.

Figure 9:
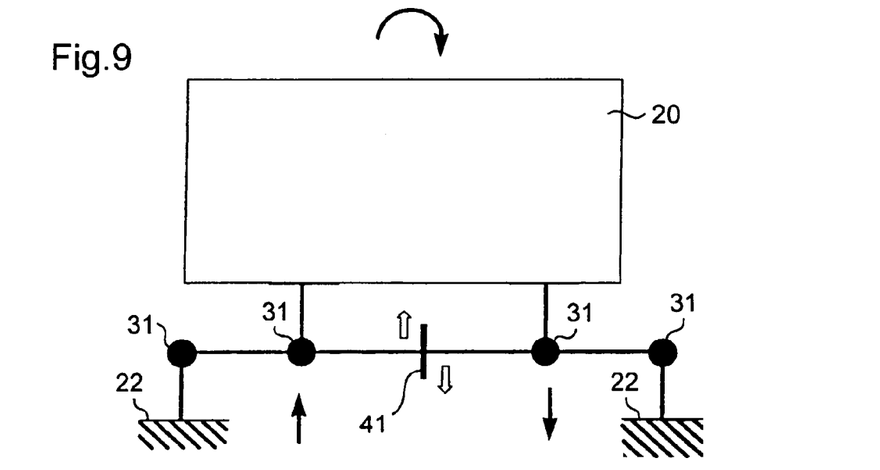
FIG. 9 is a diagram showing the bending forces acting on the spring blade of the FIG. 5 device during pivoting movements about the short transverse axis X of the battery.

With reference to FIG. 9, for pivoting movement about the X axis, the linkage of the mechanism does not act on the twistable blades 41; the forces pass directly through the "silentblocks" securing the battery tray 23 to the "silentblocks" securing the bent arms to the structure 22.

In this mode of deformation of the suspension, the cradles are subjected to twisting about the Y axis, and their large second moment of area in twisting prevents them from deforming (i.e. their deformation is very strongly limited).

Movement in the Z direction is thus purely vertical movement and the tilting moments are reduced by the linkage of this suspension.

With reference to FIGS. 3, 4, 10, and 11, the suspension also comprises two identical assemblies 49 and 50 that extend in opposite directions, and that are disposed on either side of the central portions of the cradles 25 and 28.

Figure 10:
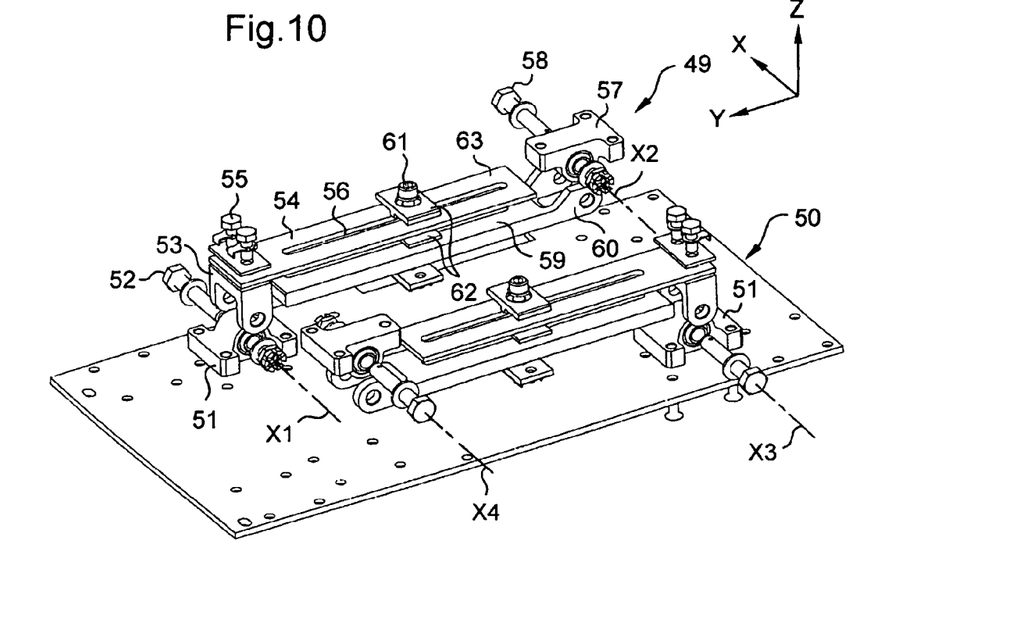
FIG. 10 is a diagrammatic perspective view of the portion of the suspension for adjusting the resonant frequency of the suspension in translation in the Y direction.
Figure 11:
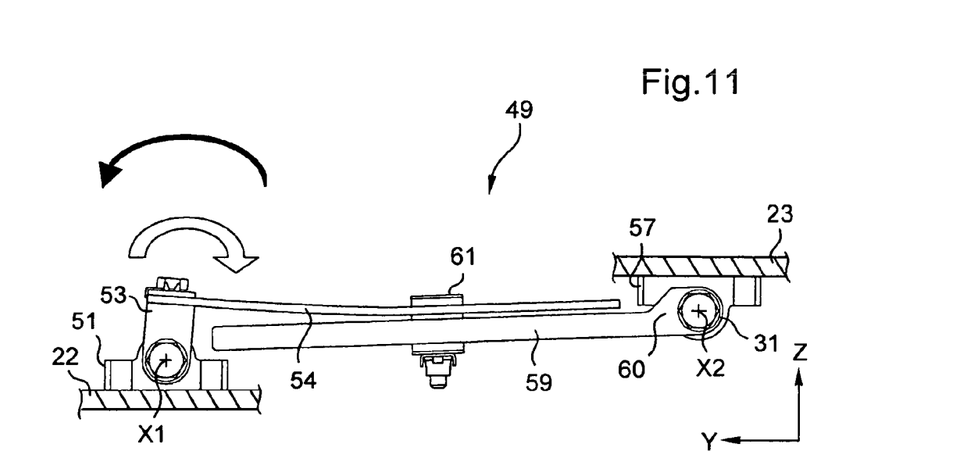
FIG. 11 is a side view of a portion of the system shown in FIG. 10 showing the adjustment of the active length of a spring blade that is subjected to bending and that is connected to a pivot bar.

Each of these assemblies, e.g. the assembly 49 shown in FIGS. 10 and 11, comprises:

- a part 51 secured to the support 22, this part receiving a resilient hinge (hidden in the figures) like the hinge of FIG. 6;
- a screw 52 extending along the axis X1 through the bore in the resilient hinge, and pivotally receiving about said axis the two pierced lugs of a fork 53;
- a blade 54 having one end clamped to the fork 53 by two screws 55; this blade extends along an axis parallel to the Y axis and presents a longitudinal slot 56;
- a fastener part 57 secured to the bottom face of the tray 23, this part receiving a resilient hinge having a screw 58 passing throughout on axis X2;
- a bar 59 presenting an end fork 60 whereby the bar is hinged about the axis X2 relative to the part 57 and to the battery tray 23; this bar is provided with a longitudinal slot extending substantially in register with the slot 56 in the blade 54; and
- a bolt 61 fitted with washers 62 and extending through the slot 56 in the blade 54 and the slot in the bar 59; the bolt is provided to hold a zone of the blade 54 by friction relative to a zone of the bar 59; the mutually facing portions of the parts 54 and 59 extend over a long fraction of their respective lengths, so moving the bolt 61 along the slots serves to secure the bar to the blade 54, either in the vicinity of the free end 63 of the blade so as to reduce the stiffness of this assembly in bending, or else in the vicinity of its clamping to the fork 53 so as to increase said stiffness.

The battery tray can move in the Y direction because of the axial flexibility of the "silentblocks".

This movement takes place between the tray and the cradles, and between the cradles and the structure. This disposition does not introduce any coupling effect between the two axes.

The resonant stiffness of the "silentblocks" contributes to tuning the frequency in the Y direction.

The additional stiffness is taken by two lateral devices 49, 50 that make use of bending in the blade 54 presenting a flexible length that can be varied by means of a rider (bolt 61).

The application of movement to the blade that is offset relative to its plane applies a moment thereto and directs a proportional force to the battery tray.

What is claimed is:

1. A device for suspending an aircraft battery the device comprising:

two springs;

two adjustment means serving to vary the stiffness of each of the two springs respectively, the springs and their associated adjustment means enabling two resonant frequencies of a suspension loaded with the battery to be adjusted, said resonant frequencies corresponding respectively to two resonant modes in deformation of the suspension under load, thus making it possible to avoid a resonator constituted by the suspended battery locking on two adjacent frequencies;

a first bent bar provided and arranged to be mounted to pivot relative to the structure of the aircraft via at least two resilient hinges about a first pivot axis that is substantially parallel to a long axis of the device;

a first of said two springs comprising a spring blade secured at two spaced-apart zones of the first bent bar, and extending substantially parallel to the first bent bar;

a second bent bar provided and arranged to be mounted to pivot relative to the structure of the aircraft via at least two resilient hinges about a second pivot axis parallel to the pivot axis of the first bar;

at least one rider mounted to slide along the second bar, said at least one rider being designed and arranged to pinch the first spring blade against the second bar, thereby reducing its active length, and consequently increasing its stiffness;

a battery support hinged on each of the two bent bars, via two pairs of resilient hinges;

at least one hinged bar pivotally hinged under the battery support and extending substantially parallel to said long axis;

a second one of said two springs comprising at least one second spring blade designed and arranged to be secured to the structure of the aircraft via a pivot and to extend along said at least one hinged bar; and a fastener member suitable for sliding along at least one of the hinged bar and the second spring blade, and for securing said hinged bar to said spring blade, while modifying a length of the active portion of the spring blade wherein said adjustment means comprise said at least one rider and said fastener member.

2. The device according to claim 1, in which the said springs and their associated adjustment means serve to adjust the two resonant frequencies of the suspension loaded by the battery that correspond respectively to two resonant modes of deformation of the suspension under load, firstly in vertical translation and secondly in lateral translation.

3. The device according to claim 1, in which the stiffnesses of the said springs are selected so that said resonant frequencies of the suspension receiving the battery are greater than 10 Hz.

4. The device according to claim 1, in which the stiffnesses of the said springs are selected so that said resonant frequencies of the suspension receiving the battery are situated in a frequency range of 11 Hz to 50 Hz.

5. The device according to claim 4, wherein the frequency range is about 20 Hz to about 30 Hz.

6. The device according to claim 1, the device being provided and arranged to be interposed between at least one support secured to the aircraft and the battery that rests on the device, the height of the device being less than the height of the battery.

7. The device according to claim 1, in which the adjustment means is continuously displaceable along a support such as a bar between two extreme positions of the member, thereby enabling the stiffness of the spring to be varied substantially continuously over a determined range of stiffness values.

8. The device according to claim 1, in which the at least one of said first and second spring blades extends substantially parallel to the long axis of the device.

9. The device according to claim 1, in which at least one of said first and second spring blades deforms in bending under the effect of the weight of the battery.

10. The device according to claim 1, in which at least one of said first and second spring blades deforms in twisting under the effect of the weight of the battery.

11. An assembly of a battery for securing to a support the assembly comprising a battery and a device for securing the battery to the support, the device being arranged to be inserted between the battery and the support, the device comprising two springs;

two adjustment means enabling the stiffness of the two springs to be varied independently, the springs and their associated adjustment means enabling two resonant frequencies of the battery assembly that correspond respectively to two resonant modes of deformation of the battery assembly to be adjusted to two distinct values;

a first bent bar provided and arranged to be mounted to pivot relative to the structure of the aircraft via at least two resilient hinges about a first pivot axis that is substantially parallel to a long axis of the device;

a first of said two springs comprising a spring blade secured at two spaced-apart zones of the first bar, and extending substantially parallel to the first bar;

a second bent bar provided and arranged to be mounted to pivot relative to the structure of the aircraft via at least two resilient hinges about a second pivot axis parallel to the pivot axis of the first bar;

at least one rider mounted to slide along the second bar, said at least one rider being designed and arranged to pinch the first spring blade against the second bar, thereby reducing its active length, and consequently increasing its stiffness;

a battery support hinged on each of the two bent bars, via two pairs of resilient hinges;

at least one hinged bar pivotally hinged under the battery support and extending substantially parallel to said long axis;

a second one of said two springs comprising at least one second spring blade designed and arranged to be secured to the structure of the aircraft via a pivot and to extend along the at least one hinged bar; and a fastener member suitable for sliding along at least one of the hinged bar and the second spring blade, and for securing said hinged bar to said spring blade, while modifying a length of the active portion of the spring blade.

12. The assembly according to claim 11, in which said first and second springs and their associated adjustment means serve firstly to adjust the resonant frequency of the battery assembly in vertical translation, and secondly serve to adjust the resonate frequency of the battery assembly in lateral translation.

13. The assembly according to claim 11, in which the stiffnesses of the springs are chosen so that said resonant frequencies are greater than 10 Hz.

* * * * *